United States Patent

[11] 3,577,808

[72] Inventor Gerrit A. Visser
 Edmonds, Wash.
[21] Appl. No. 785,964
[22] Filed Dec. 13, 1968
[45] Patented May 4, 1971
[73] Assignee The Boeing Company
 Seattle, Wash.

[54] SUB-ZERO CUTTING FLUID GENERATOR
 2 Claims, 3 Drawing Figs.
[52] U.S. Cl. ............................................... 408/61,
 82/DIG. 1, 83/169, 83/171, 261/99, 261/78
[51] Int. Cl. .................................................. B23b 47/00
[50] Field of Search ........................................ 83/169,
 170, 171; 77/55.3; 261/76, 78, 99; 62/(Inquired);
 82/900

[56] References Cited
 UNITED STATES PATENTS
3,421,392 1/1969 Bangerter et al. ............ 77/55X

| 3,253,788 | 5/1966 | McHugh et al. | (77/55.3) |
| 2,946,244 | 7/1960 | Maynard | 77/55 |
| 2,873,818 | 2/1959 | Veres | 261/99X |
| 2,929,566 | 3/1960 | Paasche | 77/55.3 |

Primary Examiner—Francis S. Husar
Attorneys—Glenn Orlob and Nicolaas De Vogel

ABSTRACT: This cutting fluid generator comprises a variety of components connected and arranged so that an improved method for applying cutting fluids (consisting of a coolant-lubricant mixture) through an external mist delivery to drills is obtained. Pressurized, dry, clean air is delivered to a mixing station provided with a venturi which increases the speed of the air via a suction chamber connected to the cutting fluid supply. The cutting fluid is micronized and intermixed into the airstream by vacuum suction of the passing air and the micronized cutting fluid will instantaneously evaporate in the mist projected onto the drill and workpiece, which will result in thorough lubrication and a −26° F. cooling.

Patented May 4, 1971
3,577,808
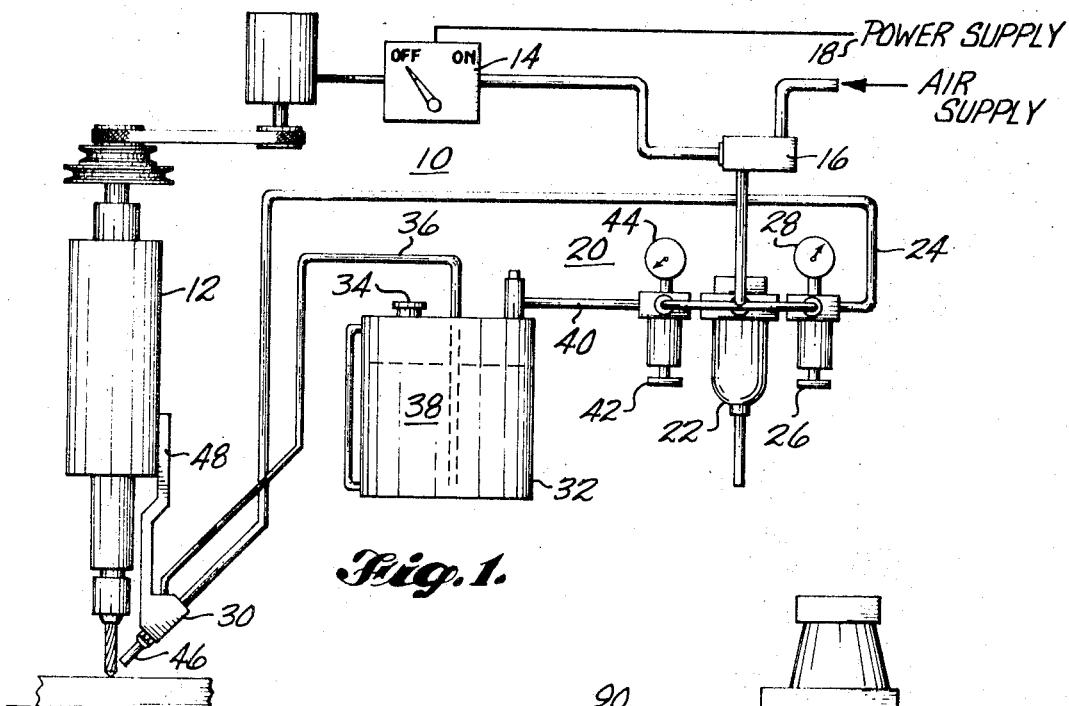
*Fig. 1.*
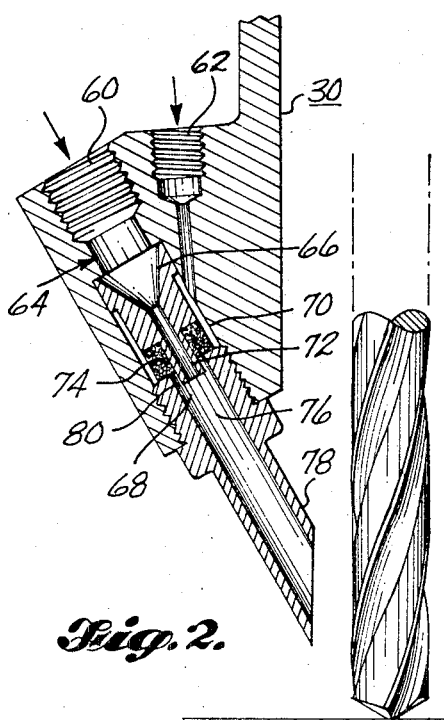
*Fig. 2.*
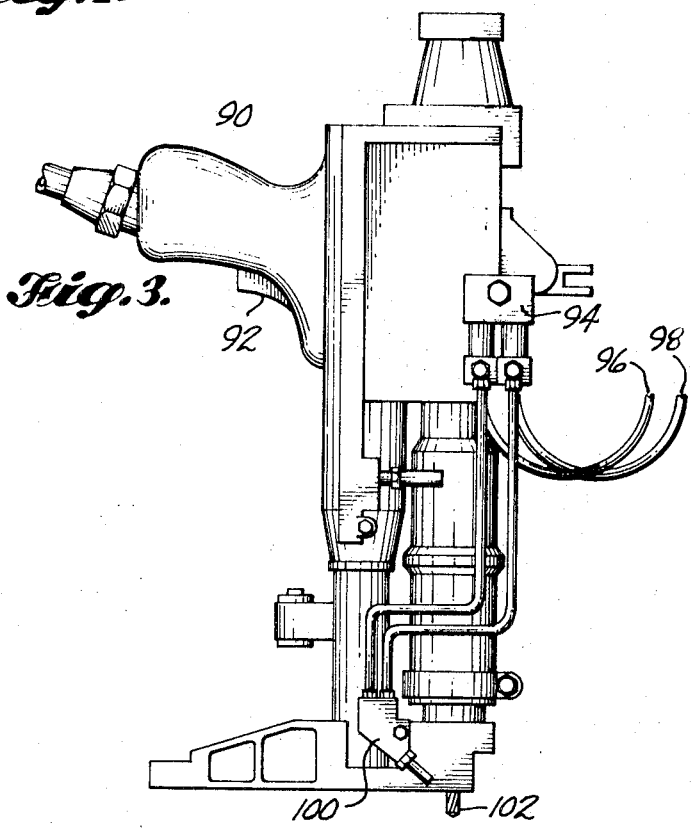
*Fig. 3.*
INVENTOR:
GERRIT A. VISSER
BY
AGENT

SUB-ZERO CUTTING FLUID GENERATOR

BACKGROUND OF THE INVENTION

1. Field

This invention relates to a subzero cutting fluid generator apparatus which comprises an air intake with an air filter and dryer means. The air thus cleaned and dehydrated is compressed through an air compressor connected to a nozzle. A supply of cutting fluid disposed in a stainless steel container is connected to the same nozzle. The nozzle has an air passage with a convergent-divergent portion wherein the divergent portion has a wall made of a porous material. The cutting fluid output is connected to the porous material and through capillary action of the material and low pressure on the fluid the material is completely saturated and wetted thereby. The airstream passing the porous material will create a vacuum and micro particles of the cutting fluid will be sucked into the airstream. The exterior nozzle output is aimed at the drill cutting area and mounted at a ½ to 11/2 inch distance therefrom.

The instantaneous evaporation of the mixture of air and particles of cutting fluid, which occurs during leaving the nozzle and hitting the drill end and workpiece in the formed cutting fluid mist, provides a temperature of −26° F.

The method involves making dry clean air, pressurizing the air and increasing the speed of the air, micronizing the cutting fluid and intermixing the cutting fluid with the air so that instantaneous evaporation of the micronized particles takes place. This evaporation causes a temperature drop in the mist directed at the drill bit. The cutting fluid utilized possess both coolant and lubricant characteristics. The exceptional results, such as stress cracking of chips, that are obtained by this method and its many unobvious advantages will be thoroughly described hereinafter.

2. Prior ARt

The concept of cooling and lubricating drill bits and the like using the general technique of mist delivery is in general well known. For instance, in the U.S. Pat. No. 2,946,244by H. J. Maynard, a method and apparatus for mist cooling cutting tools is disclosed. However, the pressure regulator is connected on the air supply only and the same air pressure is supplied to the cooling reservoir and the air mixing valve. It is essential here that the pressure at the fluid is greater than the air pressure so that the liquid is poured into the airstream for forming a mist. The invention by Maynard generally describes a mixing technique based on the conception that a liberal amount of cutting fluid produces a better performance in drilling and cutting or the like. Furthermore, a disadvantage exists in this method when small particles of the workpiece or metal fly in random directions and hit the nozzle opening, which will result in a clogging and back pressure. Insufficient fluid and evaporation exist, which is undetectable during the drilling performance. Subsequently, overheating, poor holes, etc. will result when this happens.

Various other patents have been issued, such as U.S. Pat. Nos.

| 2,552,463 | SEARLES | 3,120,766 | ZAGAR |
|---|---|---|---|
| 2,635,399 | WEST | 3,364,800 | BENJAMIN et al. |
| 2,850,854 | LEVY | 3,383,879 | TICE |
| 3,096,668 | MAYNARD | | |

These patents are all indirectly related to a cooling system, but more particularly related to a way of cooling the drill through a special drill configuration, such as drills provided with tiny holes and canals which are disposed parallel to the drill axis. In the patent to TICE an aerosol can and depressable valve is disclosed, which can contains a refrigerant under pressure. However, as will be noted from the above-mentioned patents, which were revealed by a thorough patent search, the method and apparatus disclosed in the present invention are entirely different.

The general and well known concepts of supplying a coolant and lubricant in mist form to drill or cutting tool as known in the prior art recommends that a liberal amount of lubrication and cooling will benefit the operation.

Since the cutting fluids are very expensive, and since the present invention reduces the amount of cutting fluids used by 50percent, it will be obvious to people familiar with this art that a saving as well as an improvement is accomplished by this invention. Furthermore, it has been proven that by using less cutting fluids a better drilling performance and hole finish is obtained than by the conventional methods. Tests have shown that temperatures were recorded between −10° F. to −26° F. In addition, it should be noted that most of the existing systems have the problem that back pressure can be created through a foulup or clogging which is impossible in the system and method disclosed hereinafter.

The instant evaporation of the micronized cutting fluid in mist form or gaseous form in the fast speeding air has provided a reduction of temperature from room temperature to −20° F. in a distance of 1¼ inch using an almost unmeasurable airspeed of more than 100 M.P.H. In general, it can be stated that in order to obtain the greatest reduction in temperature for a given dry air velocity a very fine control of the amount of cutting fluid to be introduced into the airstream is necessary. The relationship between the air flow and the cutting fluid is very critical. In assuming that the speed of the air is 100 M.P.H. and the distance from the nozzle to the drill cutting portion is 1¼ inches, then the drop in temperature over that 1¼ inches has to be accomplished. This last drop in temperature can only be done if the cutting fluid is divided into liquid drops which in turn should be divided into micron sized particles, so that an instantaneous evaporation takes place. Thus, it can be seen that a close control and adjustment of the air pressure and the amount of cutting fluid is important. Also, a perfect distribution of the coolant-lubricant or cutting fluid particles into the airstream is necessary for maximum reduction of temperature.

In the method of mist cooling cutting tools as described herein, the cutting fluid is a mixture of a lubricant and a coolant or refrigerant. Various types of such liquids are available on the market, for instance, a cutting fluid named "Freon" protected by a U.S. Registered Trademark, and U.S. Pat. No. 3,129,182. This Freon is available in various ratios of trichlorotrifluoroethane and ethylen glycol monobutyl ether, and therefore, cutting fluids for certain applications have been marketed named Freon T-B1, Freon 11 and Freon 113, etc. Through experimentation with the above cutting fluids and others, desirable low degrees in Fahrenheit have been obtained. During those experiments, it was found that the perfect method and apparatus used needed various necessary conditions, such as storing the fluid in stainless steel containers or pressurizing tanks, using stainless steel fittings, and preventing moisture from entering into the system or the various components of the apparatus. Thus, in other words, a dry air, a clean air and a clean cutting fluid are very important. Under those conditions and with the method described, it has been found that the drill's life expectancy is almost limitless and that the holes drilled are almost perfect, since no thermal expansions exist and thus extremely close tolerances can be achieved.

Furthermore, in assembly line production where thousands of holes have to be drilled, one after the other, a heat buildup is an existing normal problem which is greatly reduced with the present described method of cooling. In addition, cooler operations minimize or eliminate aluminum cladding during high speed drilling.

In summary, to obtain the greatest reduction in temperature for a given dry air velocity a very accurate control of the amount of Freon T-B1 or similar cutting fluid to be introduced into the airstream is mandatory, since there is a very close relationship between airflow and Freon T-B1. Assuming that the speed of air is 100 miles per hour and the distance from the end of the venturi to the drill is 1¼ inch, then we must drop the temperature from room temperature to about 26° F. in a distance of 1¼ inches. This can only be done if we reduce the Freon T-B1 liquid drops into the smallest drop size and introduce the micron size Freon drops all around, in about perfect distribution of the venturi air outlet passage. Through and by these above steps, a subzero cutting fluid generator and method providing the utmost lowest temperatures can be obtained.

The mist cooling and lubricating of cutting tools, drills in particular, is very important in the aircraft production field for manufacturing aircraft. It is not uncommon that several $100,000 of cutting fluid is used annually by the large aircraft companies, so it can be realized that an approximate 50 percent reduced use of cutting fluid and thus a 50 percent dollar savings is advantageous, and accordingly, the subzero cutting fluid generator and method was incorporated. Drill life was increased 300 percent.

It is therefore an object of the present invention to contemplate a novel and improved apparatus and a method of delivering a mist coolant to a cutting tool in such a manner that the exact required lubricant is supplied and perfect holes are being formed without significant wear on the drill.

It is another important object of the present invention to provide a method where the cutting fluid is mixed in micronized particles well distributed into the airstream by vacuum suction and with low pressures. It is an additional object of the present invention to provide a mist cutting fluid generator and method wherein a drop of temperature is created from room temperature to −26° F., through the steps of micronizing cutting fluids and mixing with high pressurized air, within 1—2 inch distance.

These and other objects of the invention not specifically set forth above will become readily apparent from the hereinafter disclosed description.

In general, this invention relates to a subzero cutting fluid generator and method of mist cooling a cutting tool or the like comprising the steps of providing a controlled supply of air and cleaning, drying and pressurizing the air. Thereafter, feeding the air to a mixing station which is provided with a venturi arrangement for increasing the speed of the air. An amount of cutting fluid, contained in a stainless steel container, is provided through a feed line to the venturi arrangement which has porous material so that the speeded air passing the porous material will such the fluid particles out of the porous material into the passing airstream. Furthermore, the airstream is led through a nozzle exit which is positioned in a direction to spray the mixture in a mist form to the cutting tool and workpiece.

THE DRAWINGS

FIG. 1 is a chematic diagram of the complete apparatus of the subzero cutting fluid generator.

FIG. 2 is an enlarged view and cross section of a typical mixing station and nozzle mounted adjacent the drill for assembly line operations.

FIG. 3 is an elevational view of a drill and mixing nozzle arrangement to be used for small portable drilling applications, and wherein a typical combined activating mechanism is employed which prevents the operation of the drill without the fluid application.

DESCRIPTION OF THE INVENTION

The subzero cutting fluid generator 10 illustrated in FIG. 1 is provided with a power drill 12 which is activated for operation by a starting switch 14. The starting switch 14 is also connected to a valve means 16 so that when the starting switch is placed in its "on" position, a power supply will start the power drill 12 and simultaneously activate the cutting fluid mist system 20 to supply the air, the cutting fluid lubricant and coolant particles to the drill and workpiece. The cutting fluid mist or gaseous system 20 includes a means 22 for dehydrating, decontaminating and pressurizing air and a connecting line 24 interconnected by a control valve 26 with an indicator 28 for supplying the pressurized air to a mixing station 30. In addition, a stainless steel container 32 having a filter 34 is connected via an interconnecting line or conduit 36 to the mixing station 30.

In the preferred embodiment shown in FIG. 1 the stainless steel or anticorrosion container 32 containing a cutting fluid 38 has also a connection to the pressure means 22, which is interconnected by a control valve 42 and indicator 44, and thus a slight pressure to the fluid can be obtained so that the flow to the mixing station 30 can be accurately controlled by the control valve 42. The mixing station 30 comprises a body having thereon attached a nozzle 46 and external mounting means 48 for fixed positioning through fastening means onto the power drill 12.

Since the general preferred system has been shown, it is deemed unnecessary to illustrate minor details, such as adjustable positioning means and angle directing means for the nozzle 46 as well as other minor details which will be obvious to the person acquainted with the general art of supplying cutting fluids in mist form to cutting tools or drills.

Thus, when the starting switch 14 is placed in the "on" position, the power supply will activate the operation of the drill 12 and simultaneously open the valve 16 which in turn will supply air to the control valve and the air will be delivered to the mixing station 30 in a dehydrated, clean and high pressure condition, while simultaneously the cutting fluid is supplied to the mixing station 30 at a controlled flow, which is regulated by the control valve 42. The mixing station will mix the air and cutting fluid 39 in proper proportion and in a particular manner and feed the mixture via the nozzle 46 onto the rotating drill flute and workpiece.

The particular mixing operation will be described in reference with FIG. 2.

The mixing station 30 comprises an air input 60 and a cutting fluid input 62, which are connected to the interconnecting line or tube 24 and 36, respectively. The air input means 60 is connected to a venturi arrangement 64 having a thereon connected convergent-divergent channel 66 and 68, respectively, and in addition a chamber 70. A filter or porous material made from sintered metal or the like 74 is installed about the venturi canal 72. Assuming that a predetermined regulated amount of cutting fluid, controlled by the valve setting 42, will enter the fluid input 62 in the mixing station 30, the fluid will be filling the chamber 70 and saturate the porous material 74. Simultaneously an airflow under high pressure will enter the air input 60 and be compressed in the venturi convergent section 66 and thereafter be led via the venturi canal 72 into the extended area 76 of the nozzle 78. The airstream will pass the circular cavity 80 with a high velocity and subsequently draw a vacuum in the cavity 80, which will cause a suction or vacuum onto the sintered material 74 containing the fluid 38. As a result, the fluid contained in the porous material 74 will be drawn via the vacuum cavity 80 and properly distributed into the passing airstream traveling through the nozzle 78 onto the cutting tool.

In essence, the vacuum suction of the fast speeding air will draw the liquids through the sintered material 74 and micronize this liquid into the finest particles possible so that the tiny invisible micronized particles will be adapted to immediate evaporation and it can therefore be said that the immediate evaporation will occur from the cavity 80 onto the drill and workpiece which in general is a distance of less than 1½ inches. The immediate instantaneous evaporation that occurs here will create a temperature drop from room temperature down to a minus 26° F. at the workpiece. It will be understood by persons familiar with this art that the very low cooling temperature, as well as the lubrication that is accomplished by this system is a unique improvement to the generally well known external mist delivery systems known in the prior art and used on conventional drilling assemblies.

Thus, the apparatus and method that is shown in FIGS. 1 and 2 accomplish an improved mist cooling and lubricating procedure wherein the spray mist or gas is directed to the intersection of the cutting tool and the work surface. Subsequently, the cutting tool and the working surface is cooled, thereby heat is drawn from both.

Of course, other well known methods can be used for supplying the mist to the drilling hole. It should be noted that eventually occuring chips cannot clog this system to the extent that a back pressure is developed as happens to conventional systems.

The discussed apparatus and method of mist delivering has been explained in a high production drilling machine assembly operation. However, it is also applicable to portable drills for drilling applications.

Referring to FIG. 3, there is illustrated a portable drill 90 having a starting switch 92 which activates the power mechanism for drill rotation as well as the twin valves 94, so that cutting fluid and air are delivered through the lines 96 and 98, respectively, to the mixing nozzle 100 mounted adjacent the rotating drill 90.

It is deemed unnecessary to explain the operation of the portable drill 90 and its attached cutting fluid mist system 20 which is the same as the apparatus and method as disclosed in FIG. 1.

It should be understood that the air pressure mentioned is in general greater than 75 pounds.

While the invention has been described with particular reference to the illustrated embodiments, it will be understood that numerous modifications will appear to those skilled in the art. The invention may be applied to advantage in numerous types of cutting tools other than the drill illustrated. Many other modifications may be made without departing from the spirit of this invention. Therefore, the description and the accompanying drawings should be taken as illustrative of the invention rather than in a limiting sense.

Having thus described my invention, what I claim and desire to obtain by Letters Patent of the United States is:

I claim:

1. A subzero cutting fluid mist generator apparatus for power drills comprising in combination:
   a. a container carrying a cutting fluid having lubricant and refrigerant characteristics,
   b. an air compressor,
   c. a first regulating valve and indicating means connecting said air compressor to said container for supplying a low pressure to said cutting fluid,
   d. a mixing station with a nozzle,
   e. a second regulating valve and indicating means connecting said air compressor to said mixing station for supplying high air pressure to said mixing station,
   f. a conduit connecting said container to said mixing station for supplying said low pressure cutting fluid to said mixing station, and
   g. said mixing station employing a first chamber having a venturi arrangement for speeding up said compressed air from said air compressor and for exhausting said speeded-up air via said nozzle to said associated power drill cutting surfaces, and a second chamber containing porous material for receiving and micronizing said supplied cutting fluid and a third chamber between said first and said second chamber so located that said speeded-up air passes adjacent to said third chamber whereby said micronized cutting fluid, under a regulated low pressure set by said first regulating valve in coordination with said high air pressure regulated by said second regulating valve in proper relationship, will be lifted from said porous material and travel via said third chamber into said high pressure speeded-up air towards said nozzle thereby forming said subzero nozzle cutting fluid mist output.

2. A subzero cutting fluid generator apparatus for power drills as claimed in claim 1 wherein said mixing station venturi arrangement for said compressed air comprises a convergent channel connected to a divergent channel so that said air increases its speed and wherein said divergent channel is connected to a surrounded porous material connected to said cutting fluid conduit so that said cutting fluid micronizes into said porous material and is evenly distributed into said divergent channel exit by the vacuum created by said speeded air traveling therethrough, whereby said fluid air mixture becomes a gaseous product.